Patented Aug. 6, 1929.

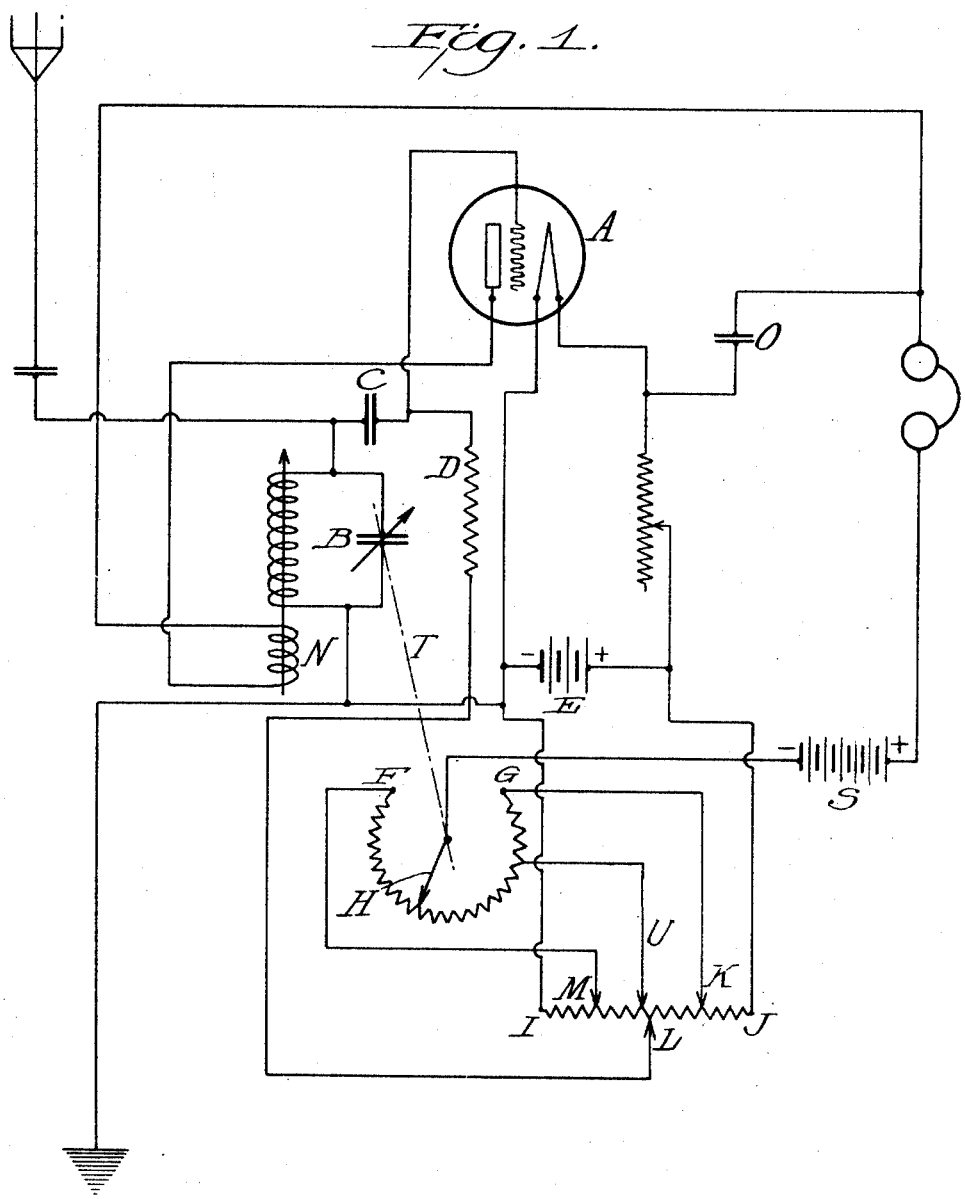

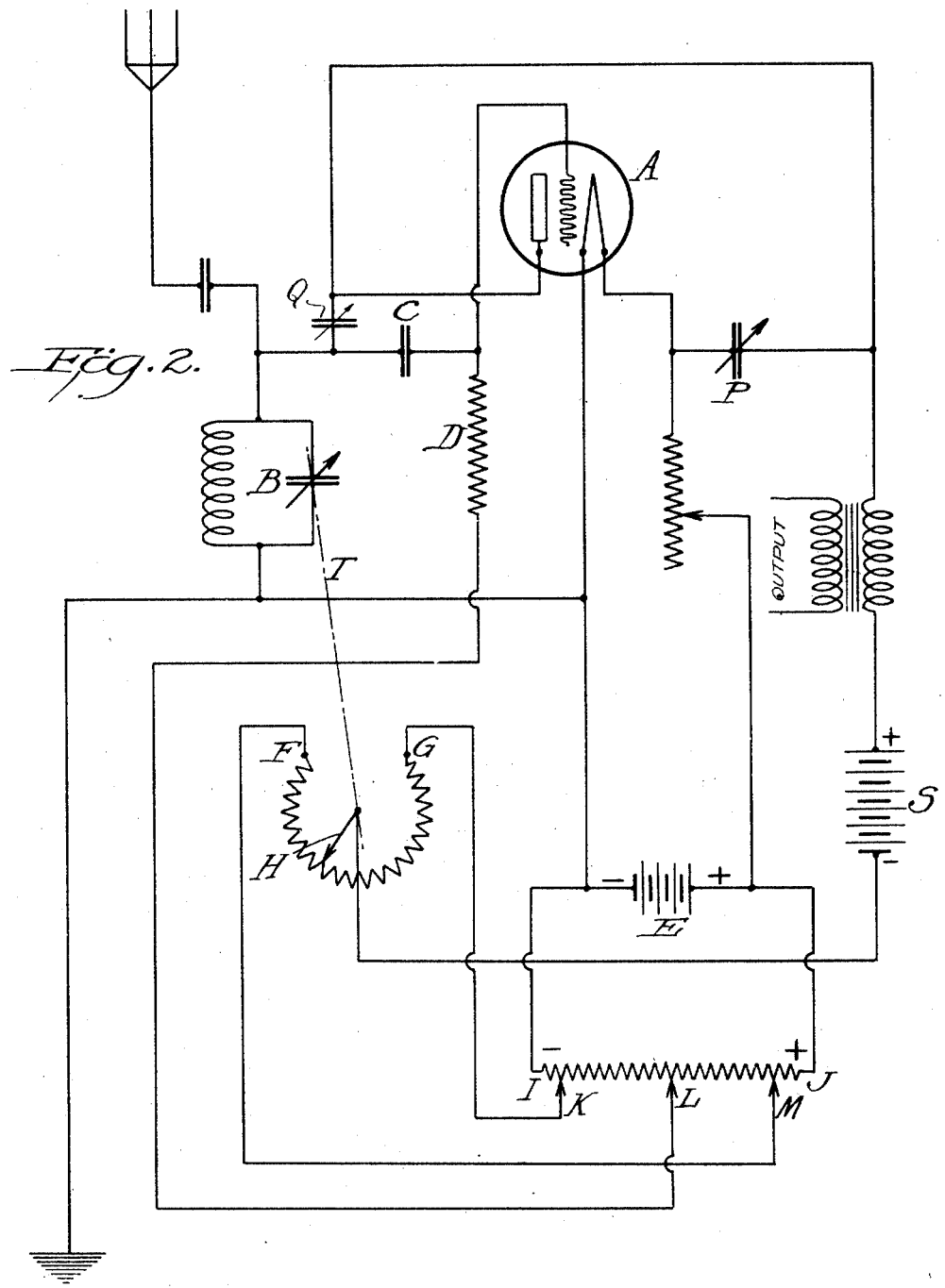

1,723,566

UNITED STATES PATENT OFFICE.

DIMMITT ROSS LOVEJOY, OF NEW YORK, N. Y., ASSIGNOR TO LOVEJOY DEVELOPMENT CORPORATION, OF NEW YORK, N. Y., A CORPORATION OF NEW YORK.

TUNED RADIO RECEIVING CIRCUITS.

Application filed December 15, 1925. Serial No. 75,561.

This invention relates to radio receiving sets employing tuned audion circuits, and has for its object the maintenance of maximum favorable regeneration and the prevention of excessive regeneration, throughout the frequency range. It is well known that regenerative circuits are liable to go into self-oscillation when tuned to resonance, with the result of impaired reception by the receiver in question and by all radio neighbors. On the other hand, the feed back of energy from plate to grid circuit or from stage to stage, improves reception in increasing amounts, up to a certain critical point, which is so close to the point where the tube spills over, that there is always the temptation for the operator to approach too near to such critical points. Indeed, it is common practice to keep turning the regeneration control until squealing commences and then to back off until maximum reception without squealing is obtained.

The total value of the energy feed backs varies in each individual set; even in sets which seem to be identical and even in the same set with different tubes. The factors which are involved in the "feed back characteristic" are the amplifying power of the tube used, temperature of the filament, potential of the grid, potential of the plate and the capacitative and magnetic coupling between the input and output circuits of one or more tubes. In this connection, it is convenient to use the expression "base line voltage" to indicate that fixed voltage about whose value the alternating component varies.

In my copending application, Serial No. 34,890, filed June 4, 1925, I have disclosed a method of preventing undue regeneration by a joint control of the tuning element and a grid voltage regulator having a potential gradient coordinated to the "feed back characteristic" of the set.

In view of the fact that the detector action of an audion depends among other factors upon the proper grid voltage, the method set forth in my said copending application is not applicable to detector tubes. However, the plate voltage, as is well known, can be varied in a detector tube without disturbing the detecting action as determined by the grid bias. The present invention utilizes this plate voltage method of controlling regeneration and thus provides a control equally applicable to amplifying and detector circuits. With a given amount of feed back coupling, there is a critical base-line voltage of the plate, which becomes less as the frequency increases, at which objectionable or excessive regeneration will occur. If the plate voltage be kept near this critical potential, but safely under it, at each frequency to which the circuit is tuned, the greatest advantage may be taken of the merits of regeneration without the danger of incurring its great disadvantage i. e. squealing and reradiation. Such means as have heretofore been employed for this purpose have been empirically and manually varied by a trial and error method so as to give the correct plate voltage each time the circuits are tuned to a given wave length, which in the case of the ordinary operator very often results inadvertently or intentionally in more or less squealing. The object of the present invention is to render this impossible.

The various plate voltage control devices which have been employed, have not had such regulation characteristics as would enable them to be advantageously connected mechanically with the tuning control, and the desirability of adjusting their regulation characteristics, to suit them to conjoint actuation with the tuning control, has not been heretofore recognized or proposed.

My present invention contemplates the employment of a plate voltage regulator adapted to be operated in mechanical and electrical conjunction with the tuning element and provides adjustments for the regulation characteristics of such regulator, whereby its operation with the tuning control may be made to conform with the requirements of the other factors of the feed back characteristic of the particular set, so that maximum efficiency of reception, without the possibility of self-oscillation, is insured throughout the frequency range.

A preferred voltage regulator comprises a potentiometer connected across a source of electrical energy which may be the same as that which supplies current to the filament, the moving contact of the potentiometer being, for example, connected to the negative terminal of the B battery.

My invention comprises means for electrically coordinating the characteristic of the potential regulator to the "feed back characteristic" so that the regulator settings correspond with the settings of the tuning means, to the end that when the two controls are actuated in unison their combined action will, ipso facto, give the proper plate voltage for the frequency determined by that setting of the tuning means, thus insuring the quiet, efficient operation of the set. The means employed may comprise, for example, first a plate voltage potentiometer in combination with means for producing or providing a desired potential gradient therein. This special potentiometer preferably has its contact arm mounted on the shaft of the tuning control. The potential gradient is so adjusted that the potential at the point of contact is correct at that particular setting of the tuning control. Thus, as the circuit is tuned, the plate voltage varies automatically, becoming less positive with respect to the negative terminal of the tube filament as the frequency becomes higher and vice versa.

Fig. 1 shows an audion hook-up in which regeneration is produced by magnetic feed back and controlled by varying the plate voltage as above set forth.

Fig. 2 shows a circuit in which the feed back is obtained by capacity coupling and controlled by varying the plate voltage as before.

In Fig. 1 is shown an adjustable magnetic coupling between the tuned input circuit B and the feed back coil N, which may be adjusted for given conditions once for all and left at this fixed adjustment. In Fig. 2 the same effect may be obtained by proper adjustment of the capacity coupling condenser Q and the by-pass condenser P which once being properly set are afterwards not changed. This preliminary adjustment of magnetic or capacity coupling, which is in the nature of an "installation adjustment", is provided so as to bring the required plate voltage regulation within the range of the plate voltage regulator throughout the frequency range.

I prefer to secure the automatic variation of the plate voltage by connecting the negative pole of the plate battery S to the movable contact arm H of a potentiometer FG, which arm is mechanically connected to the tuning condenser B (preferably by mounting it upon the condenser shaft) and moves synchronously and proportionally therewith. This mechanical connection is shown in both figures by the dotted line T. When the negative pole of the plate battery is thus connected, it is clear that any movement of the contact H over the resistance FG will vary the plate voltage by the amount of potential drop existing in that range of movement. This drop is adjusted by returning the ends FG to contacts K and M which are adapted to be adjusted along a second potentiometer IJ which in turn is connected across the filament-battery E. It is also clear that when the points MK are moved on the potentiometer IJ, the slope of the potential gradient in FG, as well as its absolute value, as measured from the negative filament terminal, are correspondingly altered.

If the contacts KM are moved to opposite ends of IJ the total drop in FG will be equal to the voltage of battery E, usually six volts. If the contacts KM are moved to intermediate positions on IJ, the potential drop in FG can be adjusted to any desired degree from six volts down to zero.

It is evident, therefore, that the contacts KM when properly adjusted serve to fix the amount of variation of the plate voltage obtained when the contact H moves in synchronism with the tuning condenser and it is easy to so proportion the amount of said variation to a proper adjustment of the coupling means N Fig. 1 and Q Fig. 2 together with a properly chosen value of the plate battery S as to provide at each frequency as determined by the tuning condenser just the right plate potential for the proper and efficient operation of the set at that frequency.

If the resistance FG be uniformly distributed the potential drop therein will also be uniform. If special shapes of condenser plates are used in B it may necessitate a non-uniform drop of potential in FG. This is obtained by making the resistance FG non-uniform. Since the contacts KM serve to fix only the end values of the potential in FG intermediate values therein may be obtained by one or more additional taps U (Fig. 1) from FG to additional contacts adjustable along IJ. This method of securing a variable drop in a uniform resistance is set forth and claimed in my copending application Serial No. 68,247, filed November 10, 1925.

It is obvious that instead of connecting the potentiometer IJ across the filament-battery E similar results may be obtained by using a separate source of electrical energy, but usually the battery E will suffice.

The system shown and described is utilized to best advantage where reliable sources of electrical energy at substantially constant voltage are available.

I claim:—

1. A radio receiving circuit comprising an audion and a tuning element, a plate voltage regulator operable by said tuning element, and means for adjusting the characteristic of said plate voltage regulator to enable said regulator to automatically maintain the plate to filament voltage at all frequencies at a point of uniform high efficiency of reception but below the point of self-oscillation.

2. In a tuned radio frequency amplifying circuit using a vacuum tube with plate, filament and grid electrodes, a plate to filament voltage source, and a tuning element, means for automatically varying at different frequencies the value of the base line voltage of the plate to filament in a direction and to an extent suitable to offset the change of the remaining factors of the feed back characteristic, occuring at such change of frequencies, for the purpose of maintaining maximum efficiency throughout the frequency range, said means comprising a potentiometer having its movable contact connected electrically to the negative end of the plate to filament voltage source and mechanically interconnected with the tuning element and a second potentiometer for adjusting the potential gradient of the first mentioned potentiometer connected across a source of potential which in turn is connected to the filament.

DIMMITT ROSS LOVEJOY.